United States Patent

[11] 3,607,929

[72] Inventors Albertus H. Pecasse; Jentje Bonnema; Gerardus A. Geurts, all of Geleen, Netherlands

[21] Appl. No. 695,360
[22] Filed Jan. 3, 1968
[45] Patented Sept. 21, 1971
[73] Assignee Stamicarbon N. V. Heerlen, Netherlands
[32] Priority Jan. 11, 1967
[33] Netherlands
[31] 6700368

[54] INCREASING THE OPTICAL PURITY OF L-LYSINE MONOHYDROCHLORIDE
6 Claims, No Drawings

[52] U.S. Cl. .......... 260/534
[51] Int. Cl. .......... C07c 99/12, C07c 101/24
[50] Field of Search .......... 260/534 L, 534

[56] References Cited

UNITED STATES PATENTS

| | | | |
|---|---|---|---|
| 3,405,159 | 10/1968 | Krieger et al. | 260/534 |
| 3,131,216 | 4/1964 | Buck-Hansen | 260/534 L |
| 2,556,917 | 6/1951 | Hambrock et al. | 260/534 L |

*Primary Examiner*—Charles B. Parker
*Assistant Examiner*—Jacqueline L. Davison
*Attorney*—Cushman, Darby & Cushman

ABSTRACT: A process for the purification of optically active lysine monohydrochloride, containing racemic lysine monohydrochloride as an optical impurity, is disclosed. In this process the solid salt is treated with water to effect an at least partial dissolution or extraction of the optical antipod of the lysine monohydrochloride which is present in the original salt. The aqueous solution thus formed is separated from the solid phase before an equilibrium state is reached, the solid phase thus obtained being of lower optical purity than the original salt.

INCREASING THE OPTICAL PURITY OF L-LYSINE MONOHYDROCHLORIDE

The invention relates to a process for increasing the optical purity of optically active lysine monohydrochloride containing DL-lysine monohydrochloride as an optical impurity. The process comprises removing therefrom a fraction containing DL-lysine monohydrochloride and having an optical purity lower than that of the original lysine monohydrochloride. The remaining lysine monohydrochloride then has a higher optical purity than the original lysine monohydrochloride.

According to the process described in U.S. Pat. Specification No. 3,131,216, L-lysine monohydrochloride of high optical purity can be obtained by preparing an unsaturated aqueous solution of L-lysine monohydrochloride containing DL-isomer, and having an optical purity of, say, 95 percent. The solution can then be concentrated by evaporation until the amount of water remaining corresponds only to the amount needed for forming a saturated solution of the available amount of pure L-lysine monohydrochloride at a predetermined lower saturation temperature. The concentrated solution can then be cooled to said saturation temperature and, with a simultaneous addition of DL-lysine monohydrochloride as a seed material, a solid substance will be crystallized and subsequently separated at said saturation temperature.

The crystallized lysine monohydrochloride which thus separates from solution has a lower, and the lysine monohydrochloride left in the solution a higher, optical purity, than the original impure L-lysine monohydrochloride. The L-lysine monohydrochloride of thusly increased optical purity can then be recovered from the solution in the solid state, for example by spray drying.

The execution of this known process is based on the circumstance that DL-lysine monohydrochloride is itself only slightly soluble in an aqueous solution saturated with L-lysine monohydrochloride (the same holds, of course, in the case of an aqueous solution saturated with D-lysine monohydrochloride). It has now appeared, however, that notwithstanding the addition of seed material, the DL-lysine monohydrochloride phase crystallizes only very irregularly from the concentrated solution at the saturation temperature. Occasionally the required crystallization takes place only after an unreasonably long time. Due to this irregular crystallization at an accurately defined temperature, industrial realization of this known process has been an extremely costly proposition.

It is an object of the present invention to provide an improved process for increasing the optical purity of optically active, but impure, lysine monohydrochloride, which can be realized on a large scale in a simple manner.

This new process is characterized by the steps of treating solid lysine monohydrochloride which is optically active, but still containing a portion of DL-lysine monohydrochloride, and while still in the solid state, with an amount of water to effect partial dissolution of the solid material present, and separating the solid phase from the liquid phase before sufficient time has passed to establish an equilibrium state.

Surprisingly, it has been found that in this way a solid phase, containing DL-lysine monohydrochloride, can be isolated having an optical purity lower than that of the original lysine monohydrochloride, so that the lysine monohydrochloride in the resulting aqueous solution has an optical purity higher than that of the original lysine monohydrochloride. In effect, the optical antipod present in the original solid salt is preferentially dissolved or extracted into the aqueous medium. Preferably at least 70 percent of the quantity of optical antiopod present in the original solid salt beside the DL-lysine monohydrochloride, is dissolved or extracted into the aqueous medium.

If desired, the dissolved lysine monohydrochloride of enhanced optical purity can then be recovered from the aqueous solution in the solid state and in the same manner as with the known procedure. The isolated solid phase of decreased optical purity can then be subjected to optical resolution by other known procedures.

This process according to the invention can be carried out at several temperatures. Other conditions being kept equal, at higher temperatures, more lysine monohydrochloride will go into solution, but the optical purity of the dissolved lysine monohydrochloride will then be lower. At lower temperatures, but under otherwise identical conditions, on the other hand, less lysine monohydrochloride will go into solution, but the optical purity of the lysine monohydrochloride in the resulting solution will then be higher. To balance these two considerations, preferably, temperatures in the range of about 40—80° C. are employed.

The solid lysine monohydrochloride used in the process according to the invention may or may not contain water of crystallization. The use of solid lysine monohydrochloride containing water of crystallization has the advantage that the period of time of the mixing operation can be taken shorter.

The water used in the process according to the invention need not be pure water. If, for example, the water already contains some dissolved lysine monohydrochloride, the desired goal can also be achieved. In the event the original solid lysine monohydrochloride is contaminated with other substances, generally there is no hindrance in nevertheless practicing the process.

In the process according to the invention, the ratio between the amount of water and the amount of solid lysine monohydrochloride may be varied.

Use of larger amounts of water, under otherwise identical conditions will cause more lysine monohydrochloride to go into solution, but this will have a lower optical purity whereas the use of a smaller amount of water will produce the opposite effect.

Use of an amount of water such that no solid substance would be present anymore in the equilibrium state, may also produce the result envisaged by the invention, because according to the invention the mixing operation is terminated before an equilibrium state is reached and then there is always a solid phase present. Optimum results can be obtained if the total amount of water (inclusive of water of crystallization, if any) in the mixture corresponds to the amount of water, which at the temperature at which the mixing of the solid lysine monohydrochloride with the water is terminated, would be required to form a saturated, or substantially saturated, solution of the quantity of pure optical antipod present in the original solid lysine monohydrochloride. Such an amount of water is also used in the known process. Surprisingly, it has been found that if this amount of water is used in the process according to the present invention, the lysine monohydrochloride in the resulting aqueous solution has a higher optical purity than it would have at equilibrium under otherwise identical conditions, This affords an important advantage over the known process wherein in the maximum optical purity which can be achieved for the dissolved lysine monohydrochloride in the solution can never be higher than the value corresponding to the state of equilibrium.

If other amounts of water are used, other points of equilibrium may be established between a solid phase containing DL-isomer and having an optical purity lower than that of the original lysine monohydrochloride and a liquid phase containing dissolved lysine monohydrochloride of an optical purity higher than that of the original lysine monohydrochloride. If, however, in such an event, the nondissolved solid phase is separated off, according to the invention before an equilibrium state has established, the optical purity of the lysine monohydrochloride in the solution appears to be higher than the value corresponding to the state of equilibrium.

In addition to the parameters mentioned above, the period of time in which the solid lysine monohydrochloride is mixed with the water, may be varied in the process according to the invention. This period should, of course, be shorter than that required for establishment of the equilibrium. This is not a problem, however, because, extreme conditions being left aside, the equilibrium is established only very slowly. Excellent results can be obtained by mixing for 20–40 minutes.

The examples given hereinafter are meant to elucidate the invention without limiting its scope in any way whatsoever.

EXAMPLE 1

Two-hundred thirty-six and four-tenths g. of L-lysine monohydrochloride containing DL-isomer and having an optical purity of 92.4 percent (100 g. of anhydrous lysine monohydrochloride consists of 84.8 g. L-isomer and 15.2 g. DL-isomer) and a water of crystallization content equal to 15.4 percent by wt. are well stirred with 87.5 g. of water at 60° C. for approximately 30 minutes. The resulting mixture thus contains a total amount of water equal to 123.9 g., together with 169.6 g. of pure L-lysine monohydrochloride corresponding to a saturation concentration of pure L-lysine monohydrochloride in water at 60° C.

The undissolved solid substance is removed by filtration. This leaves 281.3 g. of aqueous solution containing 56.6 percent by wt. of L-lysine monohydrochloride of 99.1 percent optical purity. (If stirring at 60° C. is continued until equilibrium has established, the optical purity of the L-lysine monohydrochloride in the aqueous solution is only 98 percent). Spray drying of the remaining aqueous solution yields 160 g. of solid L-lysine monohydrochloride with a water content of 0.5 percent by wt. and an optical purity of, likewise, 99.1 percent.

EXAMPLE 2

Two-hundred thirty-four and two-tenths g. of L-lysine monohydrochloride containing DL-isomer and having an optical purity of 92.4 percent and a water of crystallization content equal to 14.7 percent by wt. are well stirred with 110.3 g. of water at 65° C. for approximately 30 minutes, after which the nondissolved solid substance is removed by filtration. This leaves 309.4 g. of an aqueous solution containing 53.6 percent by wt. of L-lysine monohydrochloride of 98.2 percent optical purity. (If stirring at 65° C. is continued until equilibrium has established, the optical purity is only 97 percent).

The aqueous solution is cooled down to 15° C., and thereafter the crystallized product is removed by centrifuging. This yields 105 g. of a crystalline mass containing 82.1 percent by wt. of L-lysine monohydrochloride of 99.1 percent optical purity.

The remaining mother liquid contains 79.6 percent of L-lysine monohydrochloride of 97 percent optical purity. The L-lysine monohydrochloride can be recovered in the solid state from this mother liquor in the known manner, after which the optical purity can be increased in the way described above.

EXAMPLE 3

Two-hundred thirty-five and seven-tenths g. of L-lysine monohydrochloride containing DL-isomer and having an optical purity of 95.2 percent and a water of crystallization content equal to 15.1 percent by wt. are well mixed with 84.3 g. of water at 55° C for 30 minutes, after which the nondissolved solid substance is removed by filtration. This leaves 243.2 g. of an aqueous solution containing 54.6 percent by wt. of L-lysine monohydrochloride of 99.2 percent optical purity. Spray-drying this solution yields 133.5 g. of solid L-lysine monohydrochloride of the same optical purity, and with a water content of 0.6 percent by wt.

EXAMPLE 4

Two-hundred-thirty and eight-tenths g. of L-lysine monohydrochloride containing DL-isomer and having an optical purity of 90.4 percent and a water of crystallization content equal to 13.3 percent by wt. are well stirred with 87.2 g. of water at 55 C. for 30 minutes. Next, the nondissolved solid substance is removed by filtration. This leaves 246.6 g. of aqueous solution containing 54.7 percent by wt. of L-lysine monohydrochloride of 98.5 percent optical purity. Subsequently, the aqueous solution is cooled down to 20° C. and thereafter the crystallized solid product is removed by centrifuging. This yields 84.8 g. of solid material containing 83.4 percent by wt. of L-lysine monohydrochloride of 99.4 percent optical purity.

EXAMPLE 5

One-hundred g. of solid L-lysine monohydrochloride containing DL-isomer and having an optical purity of 92.5 percent and a water content of 1.0 percent by wt. are well mixed with 61.9 g. of water at 70° C. for 25 minutes, after which the nondissolved solid substance is removed by filtration. This leaves 142.3 g. of an aqueous solution containing 57.3 percent by wt. of L-lysine monohydrochloride of 98.5 percent optical purity.

EXAMPLE 6

One-hundred g. of solid L-lysine monohydrochloride containing DL-isomer and having an optical purity of 92.4 percent and a water content of 1.0 percent by wt. are well mixed with 61.2 g. of water at 60° C. for 35 minutes, after which the nondissolved solid substance is removed by filtration. This leaves 134.7 g. of an aqueous solution containing 56.0 percent by wt. of L-lysine monohydrochloride of 98.9 percent optical purity.

Those skilled in the art will appreciate that this invention may be practiced by techniques other than those specifically illustrated in the examples and in accordance with the spirit and scope of the following claims.

What is claimed is:

1. A process which consists essentially in adding water to lysine monohydrochloride in a particulate solid state,
 which lysine monohydrochloride is optically active L-lysine monohydrochloride together with a portion of racemic lysine monohydrochloride, mixing said lysine monohydrochloride and water to effect partial dissolution of the solid material into the aqueous phase, and then separating the undissolved solid phase from the liquid aqueous phase before an equilibrium state is reached,
 whereby a solid phase of lysine monohydrochloride is obtained having a lower optical purity than the original solid lysine monohydrochloride, and a liquid aqueous phase containing optically active L-lysine monohydrochloride of increased optical purity with respect to the original solid lysine monohydrochloride.

2. The process of claim 1, wherein said mixing of said solid lysine monohydrochloride and water is effected at a temperature between about 40 and 80° C.

3. The process according to claim 1, wherein said solid lysine monohydrochloride contains water of crystallization.

4. The process of claim 1, wherein the total amount of water employed,
 including the water of crystallization present, corresponds to the amount of water, which, at the temperature at which the mixing of the solid lysine monohydrochloride with the water is terminated, would be needed to form an at least substantially saturated solution of the quantity of pure optical antipod present in said solid lysine monohydrochloride.

5. The process according to claim 1, wherein said original solid lysine monohydrochloride has an optical purity of at least about 80 percent.

6. The process according to claim 1, wherein at least 70 percent of the quantity of optical antipod present in the original solid salt beside the DL-lysine monohydrochloride, is dissolved into the aqueous phase.